United States Patent [19]

Nishino et al.

[11] 4,405,922

[45] Sep. 20, 1983

[54] FAILURE DETECTION CIRCUIT FOR IMPACT PRINTERS OR THE LIKE

[75] Inventors: Shinichi Nishino; Shigenobu Katagiri; Kazuyuki Kubo, all of Katsuta, Japan

[73] Assignee: Hitachi Koki Company, Limited, Tokyo, Japan

[21] Appl. No.: 151,573

[22] Filed: May 20, 1980

[30] Foreign Application Priority Data

May 23, 1979 [JP] Japan ................................. 54-64339

[51] Int. Cl.[3] ........................ H04Q 5/00; G08B 21/00

[52] U.S. Cl. ................................ 340/825.36; 340/644

[58] Field of Search ............................ 340/644, 825.36

[56] References Cited

U.S. PATENT DOCUMENTS

| | | | |
|---|---|---|---|
| 3,571,800 | 3/1971 | Taylor et al. | 340/644 |
| 3,835,466 | 9/1974 | Bieszczad et al. | 340/644 |
| 4,205,307 | 5/1980 | Liermann et al. | 340/644 |
| 4,263,580 | 4/1981 | Sato et al. | 340/644 |

*Primary Examiner*—Donald J. Yusko

*Attorney, Agent, or Firm*—Lowe, King, Price & Becker

[57] ABSTRACT

In an impact printer or the like having a plurality of print-hammer drive electromagnets which are respectively connected in series with switching transistors between the terminals of a voltage source, the switching transistors are normally gated into conduction by gating signals with a duration sufficient to energize the electromagnets for operating the associated print hammers. In a test mode which occurs prior to the operation of the printer, the gating signals are successively applied to the switching transistors and the duration of each gating signal is reduced so that the gated transistor remains conductive for a short interval which is insufficient to operate the hammer. The potential at a circuit junction between the respective transistor and the associated electromagnet is coupled through a voltage divider to an input of a coincidence gate which receives its another signal from the gate electrode of the associated transistor to generate a failure indication signal when the input logic states have a predetermined relation therebetween.

10 Claims, 42 Drawing Figures

FAILURE DETECTION CIRCUIT FOR IMPACT PRINTERS OR THE LIKE

BACKGROUND OF THE INVENTION

The present invention relates generally to impact printers or the like, and in particular to a failure detection circuit for an impact printer or the like having a plurality of hammer drive electromagnets and a plurality of switching transistors for respectively energizing the electromagnets in response to control signals for detecting a failure in each transistor and the associated electromagnet.

A failure detection circuit for detecting a failure in a hammer drive circuit of an impact printer is disclosed in Japanese Utility Model No. 52-3963. The disclosed detection circuit provides a check for the conduction or nonconduction of each power switching transistor and an open-circuit, or disconnection of the associated hammer drive electromagnet by comparing the logic level of a control signal for each transistor with the logic level of its output during normal operating condition of the impact printer. However, this control signal has a duration sufficient to drive the associated hammer drive electromagnet, the checking is not possible before the printer is put into operation, thus resulting in a waste of print paper.

SUMMARY OF THE INVENTION

Accordingly, an object of the present invention is to provide an improved failure detection circuit for an impact printer or the like which permits testing of the hammer drive circuits prior to the time the printer is set in operation for purposes of eliminating the waste of paper.

The present invention contemplates to generate a train of successive pulses with a duration insufficient to energize the hammer drice electromagnet for successively activating the switching transistors to generate a potential at a circuit junction between the respective switching transistor and the associated electromagnet. This potential is compared with the logic level of the pulse supplied to the associated transistor to detect whether the latter is normally functioning. In the absence of the activating pulse, the potential at the circuit junction is also compared with the logic level of the gate of the associated transistor to detect whether the latter is properly functioning or whether the associated electromagnet is connected to the transistor between the terminals of a voltage source.

BRIEF DESCRIPTION OF THE DRAWINGS

The invention will be further described by way of example with reference to the accompanying drawings, in which.

DETAILED DESCRIPTION

Figure 1:
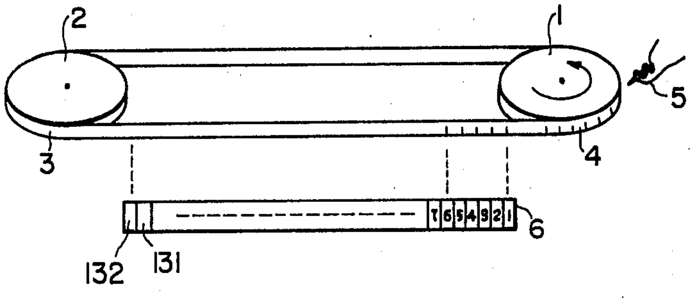
FIG. 1 is a schematic illustration of a character band and a hammer array positioned with respect to the character band, the hammer array including a set of 132 print hammers which are arranged in a predetermined spaced relation with the print characters on the character band.

Before going into the detail of the present invention, reference is first made to FIG. 1 in which a part of the impact printer is illustrated in schematic form. An endless character band 3 is movably supported on a pair of spaced pulleys 1 and 2 which are driven in a conventional manner. On the outer face of the band 3 is carried a set of print characters with character marks 4 between them at equal intervals through the length of the band 3. Adjacent the band 3 is provided an electromagnetic sensor or transducer 5 to generate mark pulses at 474-microsecond intervals in response to the marks 4 moving past the sensor 5 (FIG. 2a) for purposes of providing synchronization which will be described later. An array of print hammers 6 is mounted with respect to the character band 3 for printing characters successively selected on print paper (not shown) in a conventional manner. There is a set of 132 print hammers 6 on the hammer array. In order to achieve printing it is necessary for such character-and-hammer arrangement that there be five successive subscans for one print scan (the time between alignments of successive print characters on the band) as seen from FIG. 2b. Each subscan comprises alternately occurring reset and set cycles. In each reset cycle the hammer which has been in a printing position is allowed to restore to its original position, and in each set cycle a selected hammer is fired into the printing position. During each subscan period, the hammer to be set is selected by making a comparison between a selected print data code and a corresponding print character on the band 3.

As will be observed from Table I, hammers Nos. 1, 6, . . . 126 and 131 are successively selected in subscan No. 1 so that all of these hammers will print one after the other in the order just given, assuming that the proper character is positioned at the time in alignment with the hammer. During subscan No. 2, the hammers Nos. 2, 7, . . . 127 and 132 are successively selected and likewise, during subscan No. 3, the hammers Nos. 3, 8, . . . 128 are selected. Similarly, during subscan No. 5 the hammers Nos. 5, 10 . . . 130 are successively selected. Resetting operation is provided as follows. During the subscan No. 1, the hammers Nos. 4, 9, . . . 129 (indicated in parentheses) are successively selected so that all of these hammers are restored to their original positions one after the other in the order just given, assuming that all of these hammers have previously been in print positions. During subscan No. 2, the hammers Nos. 5, 10 . . . 130 are successively selected. Similarly, during the subscan No. 4, the hammers Nos. 2, 7, . . . 127 and 132 are selected, and during the subscan No. 5, the hammers Nos. 3, 8, . . . 128 are selected.

TABLE I

| | | |
|---|---|---|
| Print Scan | Subscan 1: | (4)1, (9)6, . . . (129)126, (x)131 |
| | Subscan 2: | (5)2, (10)7, . . . (130)127, (x)132 |
| | Subscan 3: | (1)3, (6)8, . . . (126)128, (131)x |
| | Subscan 4: | (2)4, (7)9, . . . (127)129, (132)x |
| | Subscan 5: | (3)5, (8)10, . . . (128)130, (x)x |

Figure 2:
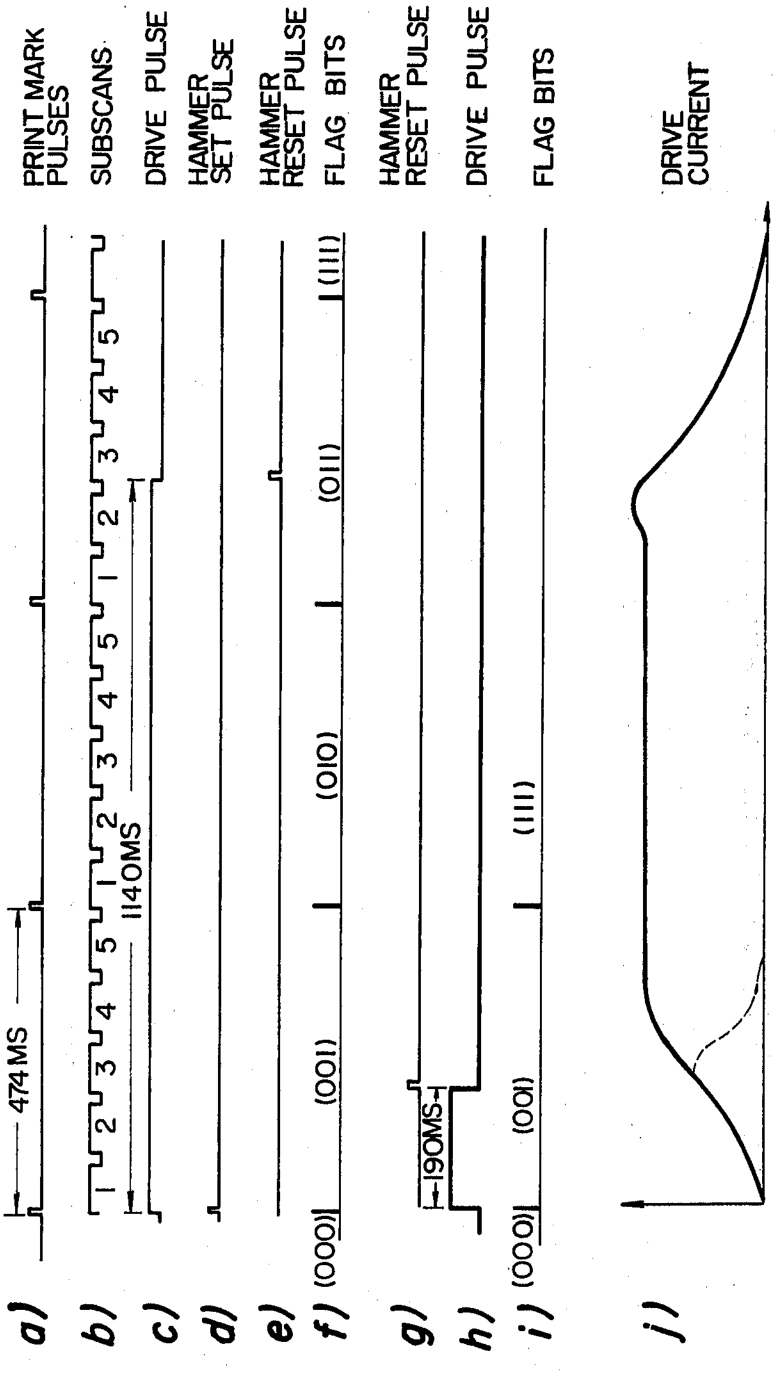
FIGS. 2a–2j are an illustration of a timing diagram for describing the operation of the impact printer embodying the invention.

During normal printing operations, the hammer 6 is activated for a period of time greater than twice the period of a print scan which is 474 microseconds as shown in FIG. 2*c*. This is accomplished by alloting at least three binary digits or "flag bits" to each print data code supplied from a data source so that flag bits (000) signify the presence of a data to be printed and flag bits (111) signify the absence of data to be printed. Subsequent to the occurrence of flag bits (000), a hammer set pulse (see Fig. 2*d*) is generated if there is a correspondence between the print data code and a character code representing the corresponding character on the band 3 to initiate energization of the corresponding print hammer and then the flag bits are updated to (001) as seen from FIG. 2*f*. During subsequent print scans, the flag bits are successively updated to (010) and then to (011) when they are read out during the second half period of the corresponding subscan. A hammer reset pulse is generated when flag bits (011) are read out in the corresponding subscan. If the hammer No. 1 has been brought into a set condition, this hammer will be reset in response to the occurrence of subscan No. 3 during the third print scan as seen from FIG. 2*e*.

Therefore, the electromagnet associated with the print hammer No. 1 is energized for a period of 1140 microseconds (which is 12 times the subscan period) and a current as indicated by a solid line in FIG. 2*j* is drawn into the hammer drive electromagnet.

During the test mode of operation which occurs prior to the normal operation of the printer, the hammer drive electromagnets are energized for a period smaller than is required for giving a sufficient impact to the associated print hammer. For example, a period of 190 microseconds (which is twice the subscan period) is appropriate for this purpose, as illustrated in FIGS. 2*g*, 2*h* and 2*i*. In this test mode, a reset pulse is generated when flag bits (001) are read out. If the hammer No. 1 is tested, this reset pulse is generated in subscan No. 3 of the first print scan. During the subsequent print scan, the flag bits are updated to (111) to signify the absence of data to be tested and thus the checking operation for the hammer No. 1 is completed.

Figure 3:
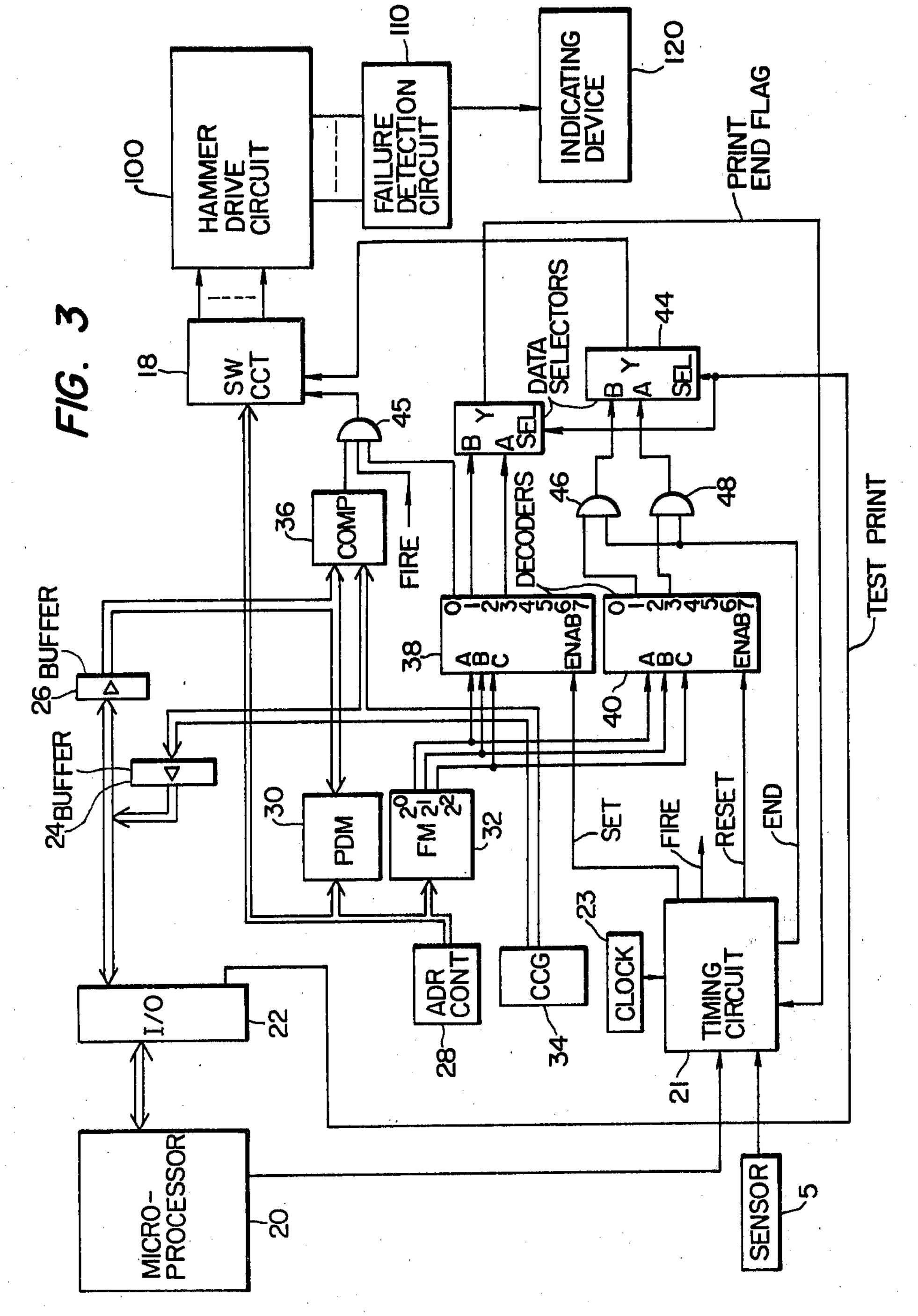
FIG. 3 is a schematic illustration of the impact printer according to the invention.

A practical embodiment of the impact printer embodying the invention is illustrated in FIG. 3. The microprocessor 20 transmits a print command signal to a timing circuit 21 according to a stored program to cause it to generate a firing pulse to effect printing and an end-of-print pulse. This timing circuit receives mark pulses from the sensor 5 to determine successive intervals for subscans Nos. 1 to 5 by counting clock pulses from a source 23 to generate set and reset pulses. During the test mode, the processor 20 applies a test print signal to the select input of data selectors 42 and 44 through an input/output port 22 and at the same time reads out a character code according to the stored program from a character code generator 34 through a triple-state unidirectional buffer 24 and I/O port 22 and then proceeds to write the read out data into a print data memory 30 through I/O port 22 and a buffer 26. The microprocessor then proceeds to write (000) in all the memory cells of a flag memory 32.

In response to a print start instruction, an address controller 28 transfers an addressed print data code from print data memory 30 to a comparator 36 which also receives its another signal from a character code generator 34. Upon coincidence, the comparator 36 places a logic one to an input of an AND gate 45 which is in receipt of an enabling signal from the "0" output of a decoder 38 in response to a set pulse delivered from the timing circuit 21 which is generated during the set cycle of the corresponding subscan. This enabling signal is derived from the flag memory 32 when the contents of the addressed flag memory cell are (000). The AND gate 45 thus generates a hammer set pulse in response to receipt of a firing pulse from the timing circuit 21 and supplies it to a switching network 18. The latter network comprises 132 flip-flops corresponding in number to the number of print hammers 6. These flip-flops are selected one at a time in response to an address control signal from the address controller 28 to activate a corresponding switching power transistor of a hammer drive circuit 100 whose operation will be described in detail hereinafter. The selected flip-flop of the network 18 is placed into a set condition in response to the hammer set pulse supplied from the AND gate 45 and the associated switching transistor of the hammer drive circuit is rendered conductive.

Concurrently, the contents of a flag memory cell corresponding to the selected flip-flop of the network 18 are updated from (000) to (001). This results in a logic one state at the "1" output of a decoder 40 when the latter is enabled by a reset signal from the timing circuit 21 which is generated during the reset cycle of the corresponding subscan. The logic one signal from the decoder 40 is coupled to an AND gate 46. This AND gate is enabled in response to an end-of-print signal from the timing circuit 21 during the reset cycle of the subscan. A logic one signal is thus applied from the AND gate 46 to the B input of data selector 44. Since the selector 44 is in receipt of the test print signal, the signal at the B input is coupled to the Y output thereof and thence to the switching network 18 as a hammer reset pulse to reset the previously set flip-flop and consequently turns off the associated switching transistor of the hammer drive circuit 100. Therefore, in the test mode the hammer drive circuit 100 is activated for an interval of 190 microseconds.

In a subsequent print scan, the print character code associated with the flip-flop just reset will be read out in the set cycle of the corresponding subscan and a set pulse is applied to the decoder 38 to supply a logic one signal from the "1" output terminal to the B input of data selector 42 and thence to the timing circuit 21 as a print end flag signal to change the contents of the associated flag memory cell from (001) to (111).

The switching transistors are thus successively activated into conductive state for an interval of 190 microseconds each until all the flag bits are updated to (111), producing a current indicated by a broken-line curve in FIG. 3 which is insufficient to activate the associated electromagnets.

In normal printing operations, an AND gate 48 is activated in response to an output from the "3" output of the decoder 40 when the contents of the corresponding flag memory cell are (011), so that the selected flip-flop of the switching network 18 and thus the associated switching transistor of the hammer drive circuit 100 is activated for an interval of 1140 microseconds which is sufficient to activate the associated print hammer into print position.

Figure 4:
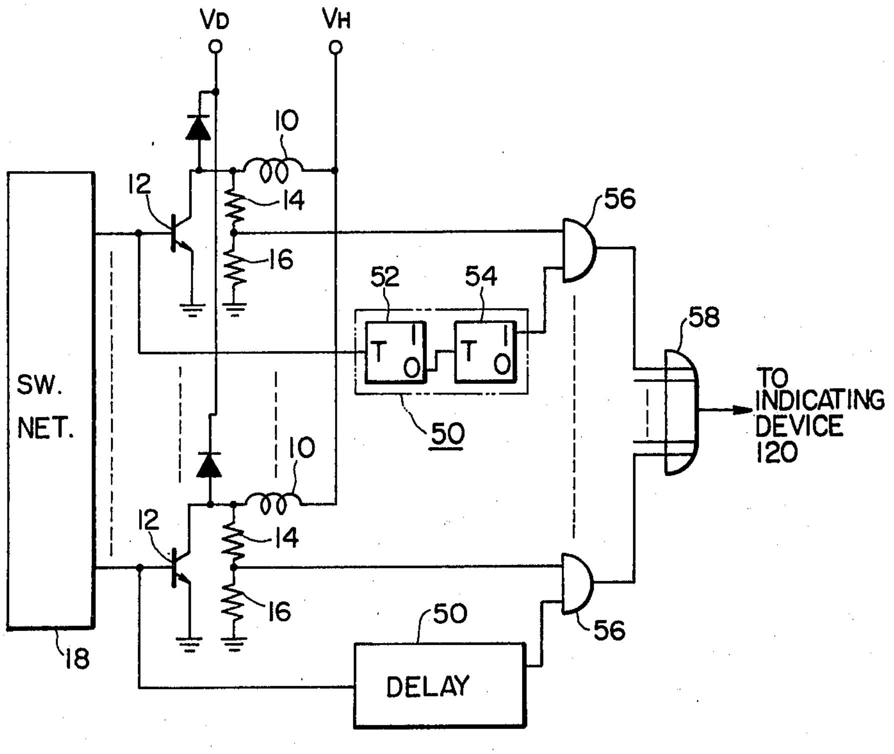
FIG. 4 is an illustration of a detection circuit of the invention.

FIG. 4 is an illustration of the details of the hammer drive circuit 100 and a failure detection circuit 110 which is constructed according to the invention. The hammer drive circuit 100 comprises a plurality of power switching transistors 12 having their bases connected respectively to the associated flip-flops of the switching network 18 and their collector-emitter paths connected in series with respective electromagnets 10 to a voltage source $V_H$. The electromagnets 10 are positionally associated with respective print hammers 6 in a conventional manner to operate the individual hammers in response to the transistors 12 being rendered conductive for an interval of 1140 microseconds.

As previously described, since the conduction period of the switching transistor during the test mode is insufficient to cause the hammer to provide impact on the character band 3. However, this conduction period is sufficient to allow the failure detection circuit to detect the presence of a failure in the hammer drive circuit 100.

The failure detection circuit 110 comprises voltage dividers each formed by resistors 14 and 16 series-connected respectively in shunt with the collector-emitter paths of transistors 12. For each switching transistor are provided an AND gate 56 and a delay circuit 50 formed by cascaded monostable multivibrators 52 and 54 connected from the base of the associated transistor 12 to an input of the AND gate 56 which receives its another signal from a circuit junction between resistors 14 and 16 of the associated voltage divider.

Figure 5:
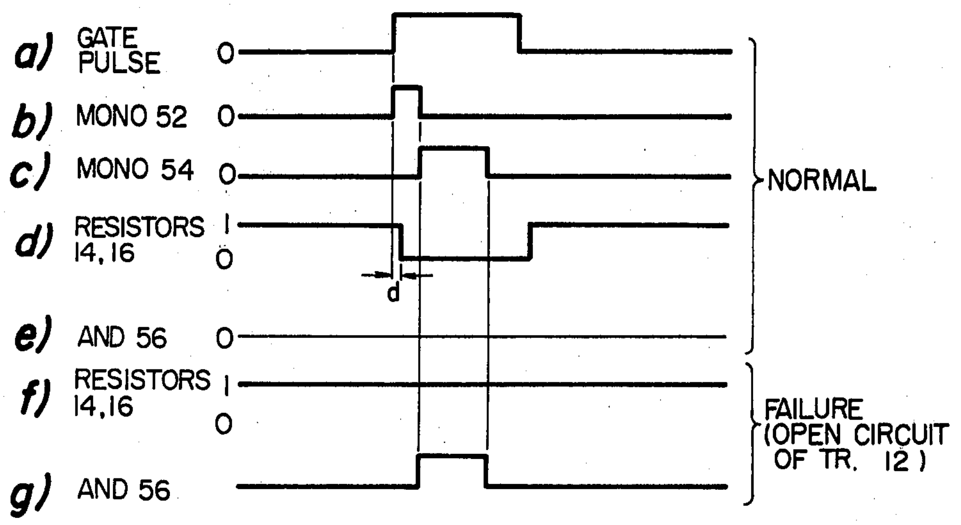
FIGS. 5a–5g are an illustration of waveforms appearing in the circuit of FIG. 4.

When a gate pulse of 190 microseconds (FIG. 5*a*) is applied to each one of the transistors 12, the latter is rendered conductive if it is functioning properly, so that the circuit junction of the voltage divider is driven to a potential corresponding to logic zero for an interval corresponding to the interval of the gate pulse but delayed by an interval "d" (FIG. 5*d*). In response to the leading edge transition of the gate pulse, the monostable 52 generates a pulse (FIG. 5*b*) and by the trailing edge of this pulse the monostable 54 is triggered to generate a delayed pulse of a predetermined duration which terminates prior to the termination of the gate pulse (FIG. 5*c*). Therefore, if the transistor 12 is functioning properly, there is no coincidence in logic one level between the inputs to the AND gate 56 so that its output remains at logic zero (FIG. 5*e*).

If transistor 12 has failed so that it exhibits a permanent open circuit condition between its collector and emitter electrodes, the circuit junction of the voltage divider is driven to a potential corresponding to logic one, thereby resulting in a coincidence in logic one between the inputs of the AND gate 56 generating an output pulse (FIGS. 5*e*–5*g*) which is supplied through an OR gate 58 to a failure indicating device 120 to give warning indication.

Figure 6:
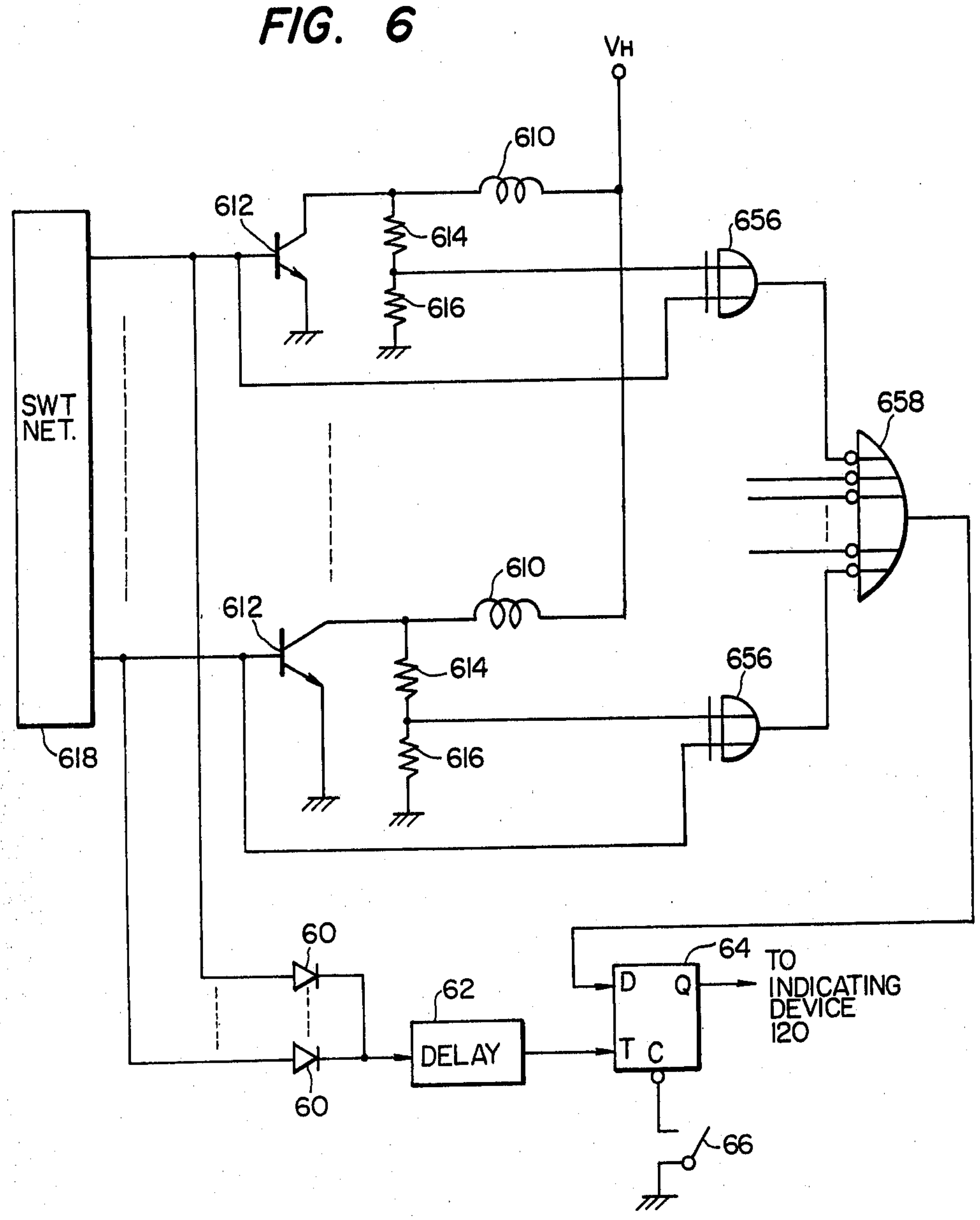
FIG. 6 is an illustration of a modified form the detection circuit.

A circuit shown in FIG. 6 is a preferred form of the failure detection circuit in which parts corresponding to those of FIG. 4 are marked with the same reference numerals as in FIG. 4, but preceded by a numeral representing the figure number. The circuit of FIG. 6 is similar to the circuit of FIG. 4 with the exception that for each print hammer an Exclusive-OR gate 656 is employed, instead of the AND gate 56, which receives the gate pulse directly from the base of the associated transistor. An inverted OR gate 658 is used instead of the OR gate 58 and a D-type flip-flop 64 is provided having its data input connected to the output of the OR gate 658 and its trigger input connected to receive a trigger pulse from a delay circuit 62 whose input is connected to the base of each transistor through diodes 60.

Figure 7:
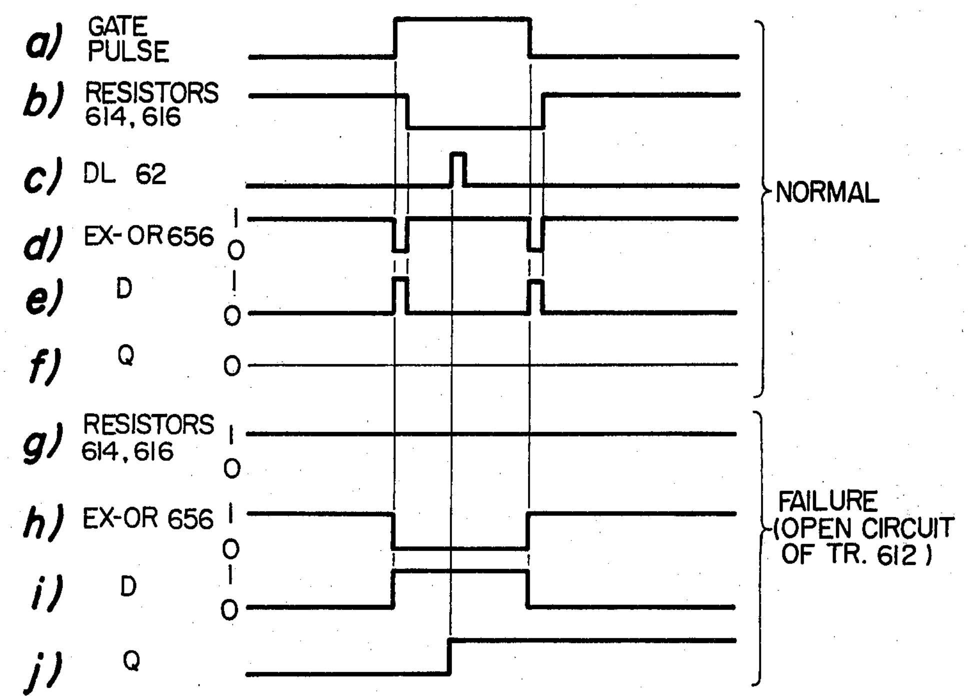
FIGS. 7a–7j and 8a–8k are illustrations of waveforms associated with the circuit of FIG. 6.

The operation of the circuit of FIG. 6 will be visualized with reference to the waveforms shown in FIGS. 7*a*–7*j* and FIGS. 8*a*–8*k*. Application of a gate pulse to the transistor 612 (FIG. 7*a*) will result in a logic zero potential at the circuit junction of the voltage divider if the transistor is functioning normally (FIG. 7*b*). The delay circuit 62 comprises essentially two cascaded monostable multivibrators as in the delay circuit 50 of the previous embodiment to generate a trigger pulse (FIG. 7*c*) in the presence of the gate pulse. The logic state of the Exclusive-OR gate 656 at the time of occurrence of the trigger pulse is "one" so that the data input to the flop-flop 64 is logical zero (FIGS. 7*d*, 7*e*). By the coinciding action of the D-type flip-flop 64, the Q output of this flip-flop remains at logic zero level indicating that the transistor 12 is functioning properly (FIG. 7*f*).

If transistor 12 exhibits an open circuit condition the potential at the circuit junction is high (FIG. 7*g*). This results in a logic zero state at the output of Exclusive-OR gate 656 and thus a logic one input to the data input of flip-flop 64 (FIGS. 7*h*, 7*i*), thus providing a logic one output from the Q output of the flip-flop 64 in response to the trigger pulse from the delay circuit 62 (FIG. 7*j*) to give failure indication.

Figure 8:
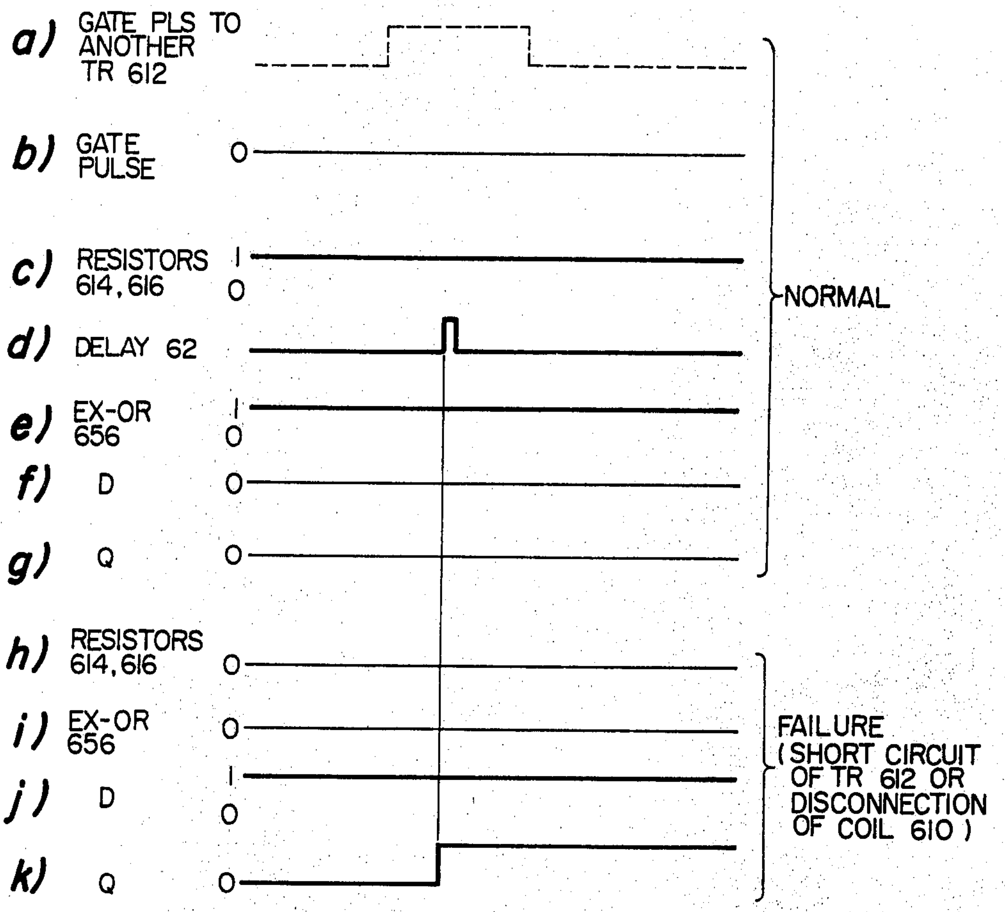

Since the gate pulses are successively supplied to the switching transistors 612, an open circuit condition of any one of these transistors can be detected. During the interval in which the gate pulse is not applied, each transistor 612 is checked to see if that transistor has failed to exhibit a short circuit condition or if there is an open circuit, or disconnection in the associated electromagnet 610. If these circuit elements are normal, the circuit junction at the voltage divider is at logic one level (FIG. 8*c*) and because of the absence of the gate pulse (FIG. 8*b*) the Exclusive-OR gate 656 produces a logic one output (FIG. 8*e*) with the data input to flip-flop 64 and its Q output going into a logic zero state (FIGS. 8*f*, 8*g*). If the transistor 612 exhibits a short circuit condition or if an open circuit condition exists in the electromagnet 610, the potential at the valtage divider is at logic zero (FIG. 8*h*), resulting in a logic zero output from Exclusive-OR gate 656 and a logic one input to the data input of flip-flop 64 (FIG. 8*j*). The trigger pulse for the flip-flop 64 is derived from a gate pulse which is applied to another transistor (FIGS. 8*a*, 8*d*). As a result the Q output of flip-flop 64 goes high in response to the trigger pulse from the delay circuit 62 to cause the indicating device 120 to generate a warning signal.

The failure indication is cleared by operating a switch 66 which supplies a logic zero potential to the clear input of the flip-flop 64.

In the foregoing description, the hammer drive electromagnets are energized for an interval insufficient to cause the hammers to move to their print positions. It is to be noted that instead of the short duration pulse the electromagnets may be energized for a longer interval with less current so that the associated print hammers remain in their original positions.

What is claimed is:

1. A failure detection circuit for an apparatus having at least one electromagnet and a switching means connected therewith in series between the terminals of a voltage source for energizing said electromagnet, and a moving element movable from an inactive to an active position in response to the energization of said electromagnet, comprising:
   - means for activating said switching means with a current insufficient to cause said electromagnet to be energized so that said moving element remains in said inactive position in response to a control signal at a first logic level and successively deactivating said switching means in response to a control signal at a second logic level; and
   - means for detecting when the signal level at a circuit junction between said electromagnet and switching means has a predetermined relationship with said logic levels to give warning indication.

2. A failure detection circuit as claimed in claim 1, wherein said detecting means comprises means for detecting when the signal level at said circuit junction has a first predetermined relationship with said first logic level to check if there is an open circuit condition of said switching means and detecting when the signal level at said circuit junction has a second predetermined relationship with said second logic level to check if there is a short circuit condition of said switching means or disconnection of said electromagnet from said voltage source.

3. A failure detection circuit for an impact printer having first and second electromagnets, first and second switching means respectively connected in series with said first and second electromagnets between the terminals of a voltage source, first and second print hammers movable in response to energization of said first and second electromagnets respectively, and a control circuit for activating said switching means successively for a duration sufficient to energize the respective electromagnets, comprising:
   - means for successively activating said first and second switching means in response to a control signal at one of two logic levels with a current insufficient to cause the associated electromagnets to be energized; and
   - means for detecting when the signal level at a circuit junction between the respective electromagnet and the associated switching means has a predetermined relationship with said logic levels of said control signal to give warning indication.

4. A failure detection circuit as claimed in claim 3, wherein said detecting means comprises means for detecting when the signal level at said circuit junction has a first predetermined relationship with one of said logic levels when said first switching means is activated with said insufficient current to check if there is an open circuit condition of said first switching means, or a short circuit condition of said second switching means, or disconnection of said second electromagnet, and for detecting when the signal level at said circuit junction has a second predetermined relationship with the other logic level when said second switching means is activated with said insufficient current to check if there is an open circuit condition of said second switching means, or a short circuit condition of said first switching means, or disconnection of said first electromagnet.

5. An apparatus comprising, first and second electromagnets, first and second switching means respectively connected in series with said first and second electromagnets between the terminals of a voltage source, means for successively activating said switching means in response to a potential of a predetermined logic level for a duration sufficient to energize the respective electromagnets when said apparatus is in normal operation, at least one moving element movable from a first position to a second position in response to the energization of said first and second electromagnets respectively, means for causing said activating means to terminate said duration prior to energization of said electromagnets when said apparatus is not in said normal operation, and means for detecting when the potential at a circuit junction between the respective switching means and the associated electromagnet has a predetermined relationship with the potential of said logic level to give failure indication.

6. An apparatus as claimed in claim 5, wherein said detecting means comprising means for detecting when the potential at said circuit junction has a first predetermined relationship with a first logic level of the potential used to activate said first switching means to check if there is an open circuit condition of said first switching means or detecting when the potential at said circuit junction has a second predetermined relationship with a second logic level of the potential used to deactivate said second switching means to check if there is a short circuit condition of said second switching means or disconnection of said second electromagnet from said voltage source, and for detecting when the potential at said circuit junction has said first predetermined relationship with a first logic level of the potential used to activate said second switching means to check if there is an open circuit condition of said second switching means or when the potential at said circuit junction has said second predetermined relationship with said second logic level of the potential used to deactivate said first switching means to check if there is a short circuit condition of said first switching means or disconnection of said first electromagnet from said voltage source.

7. An impact printer comprising, first and second electromagnets, first and second switching means respectively connected in series with said first and second electromagnets between the terminals of a voltage source, means for activating said switching means in response to a potential of a predetermined logic level for a duration sufficient to energize the respective electromagnets when said impact printer is in normal operation, first and second print hammers movable from inactive to active positions in response to the energization of said first and second electromagnets respectively, means for causing said activating means to terminate said duration prior to energization of said electromagnets when said printer is not in operation so that said print hammers remain in said inactive position, and means for detecting when the potential at a circuit junction between the respective switching means and the associated electromagnet has a predetermined relationship with the potential of said logic level to give failure indication.

8. An impact printer as claimed in claim 7, wherein said detecting means comprises means for detecting when the potential at said circuit junction has a first predetermined relationship with a first logic level of the potential used to activate said first switching means to check if there is an open circuit condition of said first switching means or detecting when the potential at said circuit junction has a second predetermined relationship with a second logic level of the potential used to deactivate said second switching means to check if there is a short circuit condition of said second switching means or disconnection of said second electromagnet from said voltage source, and for detecting when the potential at said circuit junction has said first predetermined relationship with a first logic level of the potential used to activate said second switching means to check if there is an open circuit condition of said second switching means or detecting when the potential at said circuit junction has said second predetermined relationship with a second logic level of the potential used to deactivate said first switching means to check if there is a short circuit condition of said first switching means or disconnection of said first electromagnet from said voltage source.

9. A method for detecting a failure in an apparatus having first and second electromagnets which are connected respectively in series with first and second switching means, means for activating said first and second switching means in succession in response to a signal at one of two logic levels, and at least one moving element movable between inactive and active positions in response to the energization of said electromagnets, comprising:

(a) activating said first switching means in response to said signal at one logic level with a current insufficient to cause said first electromagnet to be energized while deactivating said second switching means in response to said signal at the other logic level;

(b) detecting when the signal level at a circuit junction between the respective switching means and the associated electromagnet has a predetermined relationship with said logic level to give warning indication;

(c) activating said second switching means in response to said signal at one logic level with a current insufficient to cause said second electromagnet to be energized while deactivating said first switching means in response to said signal at the other logic level; and (d) detecting when the signal level at said circuit junction has a predetermined relationship with the logic level of the step (c) to give warning indication.

10. A method for detecting a failure in an impact printer having first and second electromagnets which are connected respectively in series with first and second switching means, means for activating said first and second switching means in succession in response to a signal at one of two logic levels, and first and second print hammers movable between inactive and active positions in response to energization of said first and second electromagnets, respectively, comprising:

(a) activating said first switching means in response to said signal at one logic level with a current insufficient to cause said first electromagnet to be energized while deactivating said switching means in response to said signal at the other logic level;

(b) detecting when the signal level at a circuit junction between the respective switching means and the associated electromagnet has a predetermined relationship with said logic level to give warning indication;

(c) activating said second switching means in response to said signal at one logic level with a current insufficient to cause said second electromagnet to be energized while deactivating said first switching means in response to said signal at the other logic level; and (d) detecting when the signal level at said circuit junction has a predetermined relationship with the logic level of the step (c) to give warning indication.

* * * * *